Dec. 22, 1964  M. U. CLAUSER ETAL  3,162,398
MAGNETOHYDRODYNAMIC CONTROL SYSTEMS
Filed Jan. 26, 1959  4 Sheets—Sheet 2
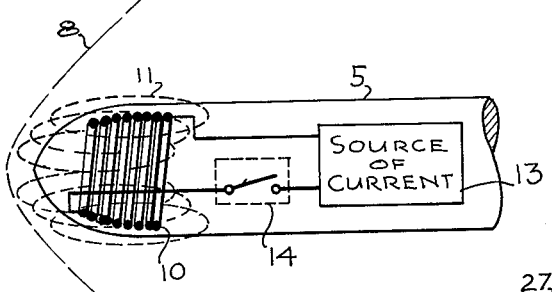
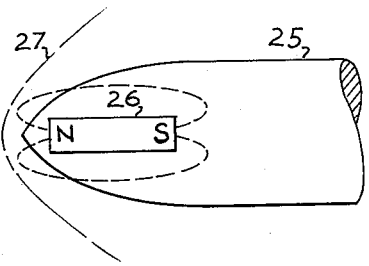
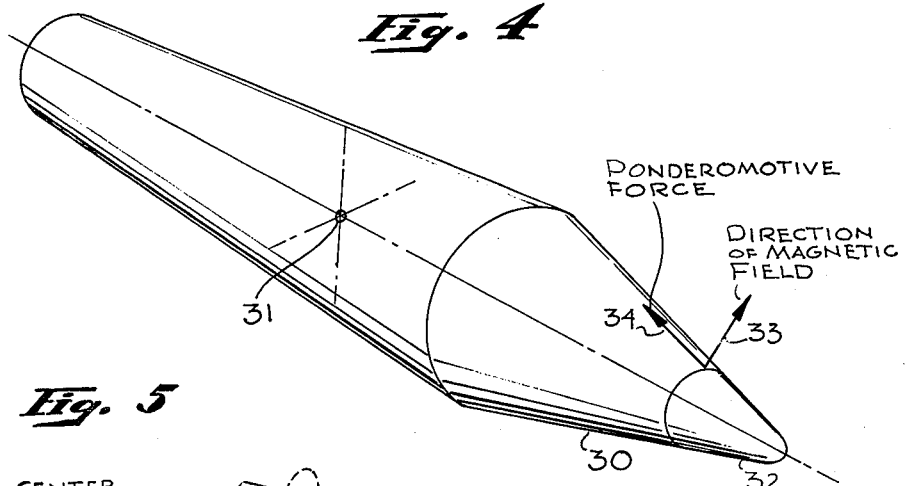
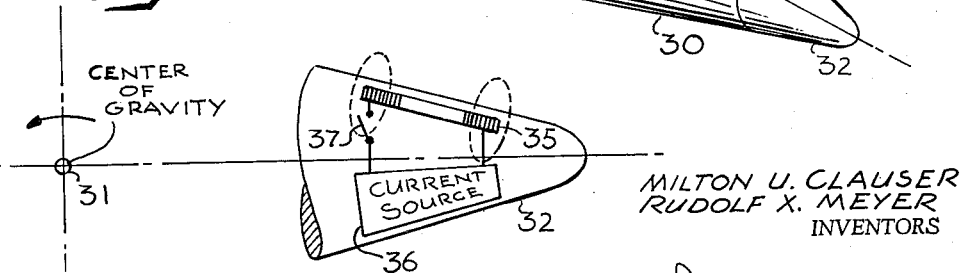
MILTON U. CLAUSER
RUDOLF X. MEYER
INVENTORS
BY Robert H. Fraser
ATTORNEY

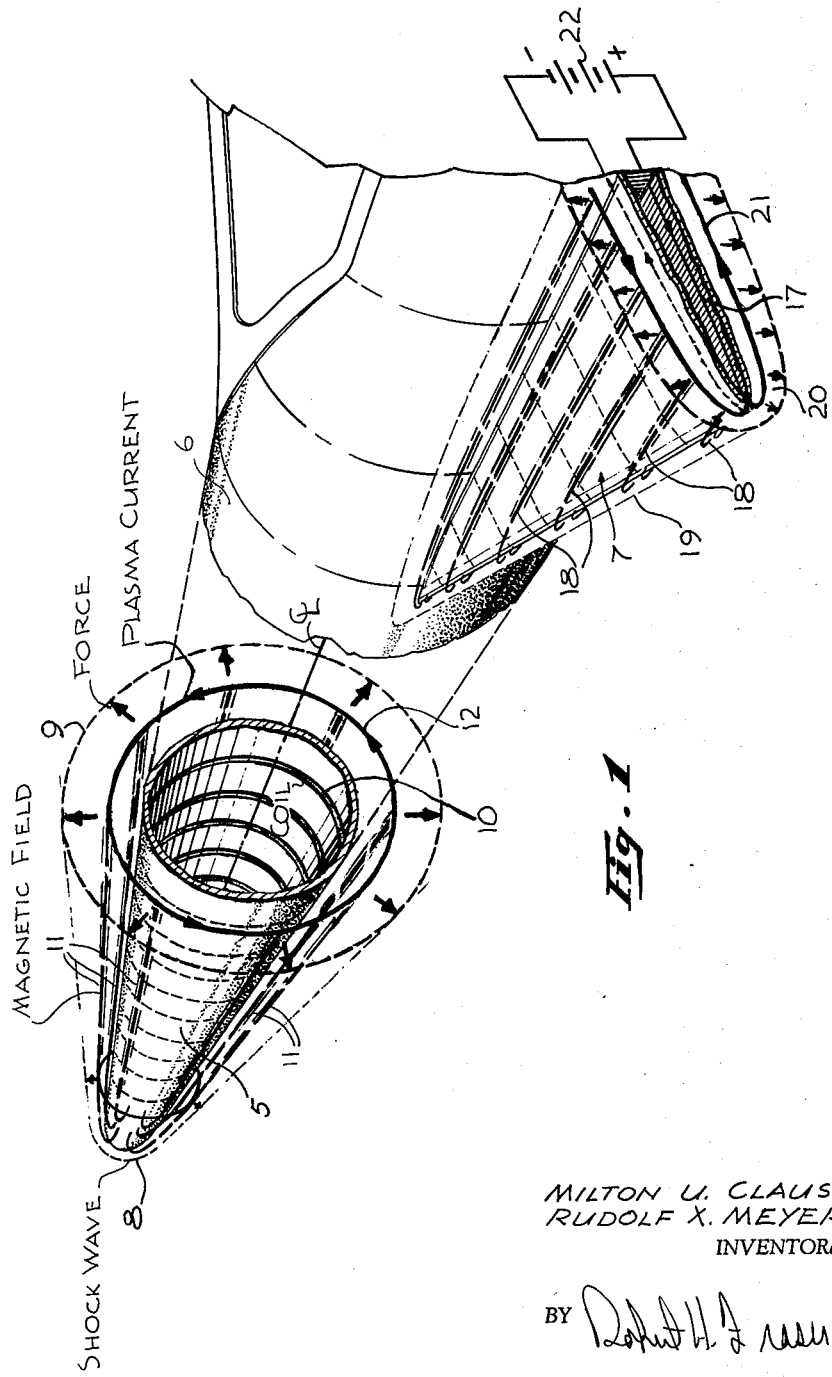

ESTIMATED ELECTRICAL CONDUCTIVITY OF AIR

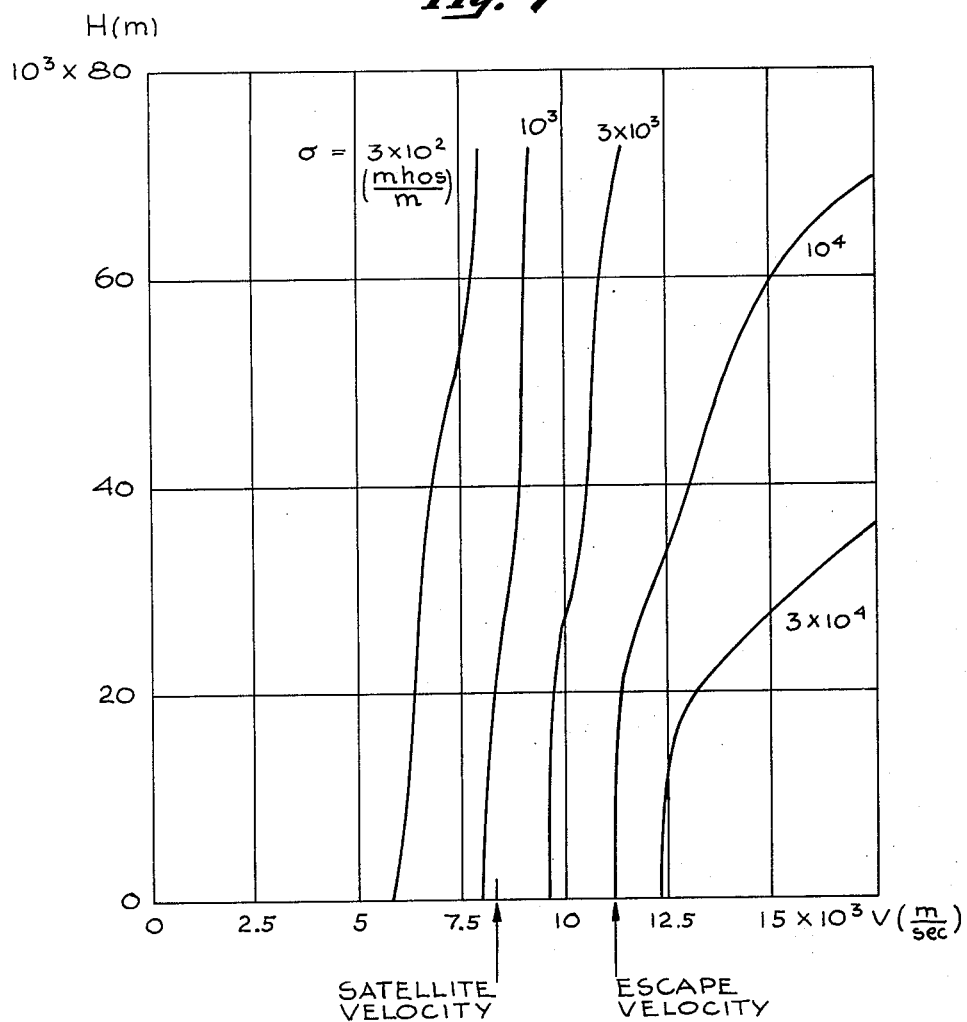
ESTIMATED ELECTRICAL CONDUCTIVITY OF AIR BEHIND A NORMAL SHOCK

United States Patent Office 3,162,398
Patented Dec. 22, 1964

3,162,398
MAGNETOHYDRODYNAMIC CONTROL
SYSTEMS
Milton U. Clauser, Rolling Hills, and Rudolf X. Meyer, Pacific Palisades, Calif., assignors, by mesne assignments, to Space Technology Laboratories, Inc., El Segundo, Calif., a corporation of Delaware
Filed Jan. 26, 1959, Ser. No. 789,202
10 Claims. (Cl. 244—14)

This invention relates to a new and improved system for controlling the relative movement between a fluid medium and a flight vehicle, and more particularly to a system in which forces are generated between a moving electrically conductive air mass and a flight vehicle in accordance with magnetohydrodynamic principles.

Where a flight vehicle, such as a missile or rocket, passes through the atmosphere at relatively high speeds, heat transfer between the turbulent air within a boundary layer and the surface of the vehicle elevates the temperature of the surface. Under extreme conditions, as where a missile re-enters the atmosphere from space, the elevation of the temperature of the surface may produce a deterioration in the material of the surface with a consequent destruction of the vehicle. Accordingly, a great deal of effort in connection with high-speed flight vehicles has been expended upon the development of materials capable of withstanding high temperatures. While materials have been developed which are inherently capable of withstanding extremely high temperatures, there still exists a limitation upon the maximum speed of a flight vehicle through the atmosphere due to the heating of the flight vehicle surfaces.

Another problem arising where a flight vehicle passes through the atmosphere at relatively high velocities is the control of the flight path. Ordinary aerodynamic control surfaces are generally not desirable due to the technical complexity and added weight of the control mechanisms.

Accordingly, the present invention is directed to a new and improved system for generating forces between a moving electrically conductive fluid and a flight vehicle whereby the flow pattern of the air surrounding the flight vehicle may be altered to reduce the heat transfer under high velocity conditions and whereby the direction of the flight path of the vehicle may be altered by reaction forces between the air mass and the flight vehicle without the use of conventional control surfaces.

Therefore, it is a primary object of the present invention to provide a new and improved magnetohydrodynamic system for producing electrical currents within a moving air mass.

It is yet another object of the present invention to provide a new and improved magnetohydrodynamic system for controlling the position of a shock wave relative to a flight vehicle.

It is still another object of the present invention to provide a new and improved magnetohydrodynamic system for steering a flight vehicle.

It is a still further object of the present invention to provide a new and improved magnetohydrodynamic system for reducing transfer of heat to the surfaces of a flight vehicle from a moving air mass.

Briefly, in accordance with the invention, a magnetic field source is positioned within a flight vehicle casing which is adapted to be propelled through the atmosphere at velocities at which a shock wave is established forward of the flight vehicle in its direction of travel. The shock wave produces an electrically conductive plasma surrounding the flight vehicle casing and the magnetic field source functions to induce currents within the plasma which interact with the magnetic field to control the flow pattern of the air mass or to alter the flight path of the vehicle.

In a preferred arrangement of the invention for reducing heating at the surface of the flight vehicle, a magnetic field source in the form of a coil is axially aligned with the direction of movement of the flight vehicle. When the flight vehicle is propelled at velocities which produce an electrically conductive plasma in the region of the magnetic fields, electrical currents are induced in the plasma which affect the position of a shock wave. As the induced currents increase, the shock wave is separated by a greater distance from the forward region, i.e. nose, of the vehicle. The result is that the flow pattern of the air mass along the surface of the flight vehicle is altered in a manner in which the transfer of heat to the surface is substantially reduced.

Where the present invention is to be adapted for use in controlling the flight path of the vehicle, magnetic field sources may be oriented in other than an axial position so that currents are induced in the electrically conductive plasma which produce reaction forces upon the magnetic field source which deflect the flight vehicle in the desired direction.

A better understanding of the invention may be had from a reading of the following detailed description and an inspection of the drawings, in which:

FIG. 1 is a fragmentary perspective view of a flight vehicle including a magnetohydrodynamic system in accordance with the invention for reducing the transfer of heat to the flight vehicle;

FIG. 2 is a diagrammatic illustration of an arrangement similar to that included in the flight vehicle of FIG. 1;

FIG. 3 is a diagrammatic illustration of an alternative arrangement of the invention utilizing a fixed permanent magnet as a magnetic field source;

FIG. 4 is a perspective view of a flight vehicle including magnetohydrodynamic means in accordance with the invention for controlling the flight path of the vehicle;

FIG. 5 is a diagrammatic illustration of a portion of a flight vehicle including magnetohydrodynamic means for controlling the attitude or flight path of the vehicle similar to FIG. 4.

FIG. 7 is a flow chart showing the estimated variations in the electrical conductivity of air behind a normal shock wave.

Figure 6:
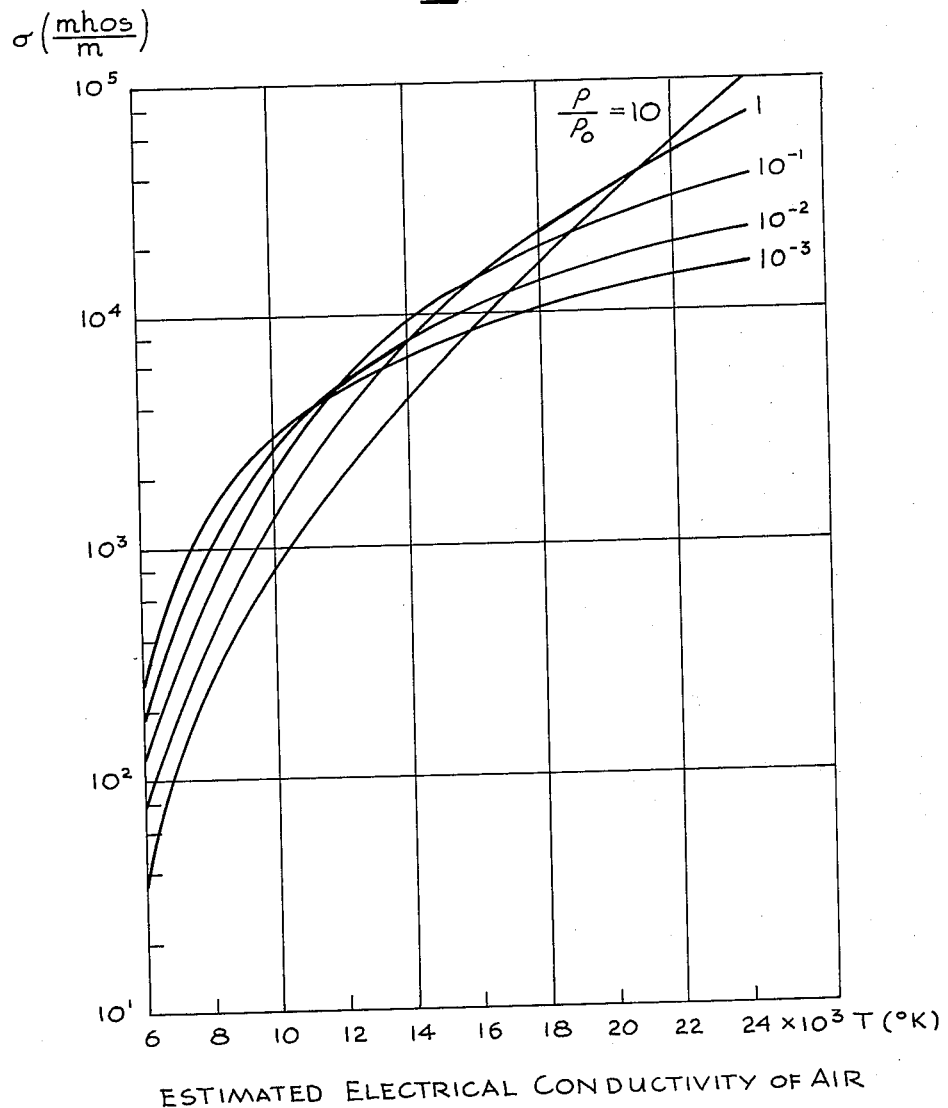
FIG. 6 is a flow chart showing the estimated variations in the electrical conductivity of air.

In FIG. 1 there are illustrated fragmentary portions of a flight vehicle casing including a forward section in the form of a nose cone 5 and a trailing body portion 6. To the sides of the body portion 6 may be attached one or more aerodynamic surfaces such as the wing 7. In operation, the flight vehicle of FIG. 1 may be propelled at a relatively high velocity by a rocket engine or the like (not shown). While passing through the earth's atmosphere at relatively high velocities, a shock wave 8 may be formed about the nose cone 5, with the air mass within the region between the shock wave 8 and the nose cone 5 being ionized to form an electrically conductive plasma. The region of the electrically conductive plasma is represented in FIG. 1 by the shaded area 9.

As is well known, where a flight vehicle passes through an air mass at high velocities, heat is generated within a region surrounding the surfaces of the flight vehicle due to the viscous dissipation of the kinetic energy present in the relative movement between the flight vehicle and the air mass. The generated heat is transferred to the surface of the flight vehicle so that the flight vehicle casing may be elevated to a temperature at which structural deterioration occurs. The elevation of the temperature at the surface of a flight vehicle is particularly acute in connection with the re-entry of a flight vehicle from space under the influence of gravity at velocities and resultant surface temperatures which no known material is capable of withstanding.

A similar phenomenon has long been observed in the burning of meteorites which arrive in the earth's atmosphere at relatively high speeds and are ignited by the temperatures produced in their passage through the atmosphere.

The arrangement of FIG. 1 is specifically adapted to overcome the aforementioned problem of heat transfer to the surfaces of a flight vehicle by means of a magnetohydrodynamic system which functions to alter the position of the shock wave 8 and to change the pattern of flow of the electrically conductive plasma in a manner which reduces the heat transfer to the surfaces of the nose cone 5 and the aerodynamic surface 7. For this purpose, a magnetic field source in the form of a coil 10 is wound inside the nose cone 5 in a manner in which the axis of the coil 10 is aligned with the axis of the nose cone 5 so that a magnetic field is produced which extends through the forward tip of the nose cone 5 following the configuration illustrated in FIGS. 1 and 2 by the lines 11. When the flight vehicle is in motion and the coil 10 is energized, magnetic fields are generated which induce annular currents within the electrically conductive plasma which flow around the flight vehicle casing as illustrated by the circular current path 12 (FIG. 1). In addition, the magnetic field at the forwardmost portion of the nose cone 5 induces electrical currents within the ionized plasma which function to push the shock wave 8 outwardly from the tip of the nose cone. The combined effect of the induced currents and the repositioning of the shock wave 8 alters the flow pattern in the region 9 in a manner which reduces the heat transfer between the air mass and the surface of the flight vehicle.

As illustrated in FIG. 2, the coil 10 may be connected to a suitable source of current 12 contained within the flight vehicle. A switch 14 may be connected serially between the source of current 13 and the coil 10 so that the magnetohydrodynamic heat reduction system in accordance with the invention may be selectively operated. Where the system is to be employed for the protection of a flight vehicle during re-entry from outer space, the switch 14 may comprise a temperature-sensitive device which is actuated when a predetermined temperature exists at the surface of the flight vehicle, indicating that the vehicle is entering into the earth's atmosphere and that the magnetohydrodynamic system should be energized to limit the transfer of heat to the flight vehicle casing.

While in FIGS. 1 and 2 the coil 10 has been illustrated as a single layer solenoid, it will be appreciated that a multiple layer solenoid or a disc solenoid may be used as well. Since the spacing between the shock wave and the forward tip of a flight vehicle has a substantial effect upon the amount of heat transferred to the body of the flight vehicle, in a practical embodiment it is desirable to utilize a multiple layer solenoid or disc solenoid positioned near the tip of the nose so as to concentrate the electromagnetic field in that region.

A magnetohydrodynamic system for reducing the heat transfer to a non-symmetrical aerodynamic surface, such as surface 7, is illustrated in FIG. 1 which functions in a manner silimar to that described above. Accordingly, a current-carrying conductor 17 may be wound in the configuration of a coil following the shape of the aerodynamic surface 7 to generate a magnetic field represented by the lines 18 in a direction substantially aligned with the flow of air over the aerodynamic surface 7. Again, a shock wave 19 may be formed which produces an electrically conductive ionized plasma surrounding the aerodynamic surface 7 within the shaded region 20. The magnetic fields generated by current flow through the current carrying conductor 17 interact with the electrically conductive plasma within the region 20 to induce currents and attendant forces which displace the shock wave 19 and alter the flow pattern adjacent the aerodynamic surface 7. The induced currents are represented in FIG. 1 by the line 21. A source of power 22 may be connected to the conductor 17 for energizing the magnetohydrodynamic system associated with the aerodynamic surface 7. As described above, a temperature-sensitive switch may be connected between the power supply 22 and the conductor 17 for rendering the system operable in response to a predetermined condition of temperature at the aerodynamic surface 7.

An alternative magnetohydrodynamic system for reducing the transfer of heat to the surface of a flight vehicle is diagrammatically illustrated in FIG. 3 in which the nose cone 25 of a flight vehicle is equipped with a permanent magnet magnetic field source 26. From a comparison of the magnetic field configuration of the permanent magnet of FIG. 3 and the coil of FIG. 2, it is apparent that the magnetic field patterns are substantially similar, with the direction of the magnetic field being directed outwardly from the tip of the nose cone 25 into the region of a shock wave 27. Where magnetic fields of sufficient strength may be obtained by means of permanent magnets to achieve the desired reduction in the transfer of heat to the flight vehicle, the permanent magnet arrangement of FIG. 3 may be employed in lieu of the current-carrying coils 10 and 17 illustrated in FIGS. 1 and 2. However, in the arrangement of FIG. 3 the effect produced by the magnetohydrodynamic system operates continuously with the result that a certain drag upon the flight of the vehicle may be expected due to the reaction forces acting upon the flight vehicle via the magnetic field and the fixed magnetic field source. Accordingly, the arrangement of FIGS. 1 and 2 is preferable where the magnetohydrodynamic system is to be selectively actuated.

Where the system is to be employed in the re-entry of a flight vehicle into the earth's atmosphere, electrochemical batteries, as for example, a silver-zinc battery, may be employed to achieve a high discharge rate for the relatively short period in which the system must be in operation, which period may be of the order of 100 seconds for the re-entry of a space vehicle from space and 25 seconds in the case of an intercontinental missile.

The coil 15 should be designed to produce the required magnetic field in the region of the tip of the nose cone with the available current flow passing therethrough. In the case of an intercontinental ballistics missile, the field strength may be of the order of 80,000 gauss, while for the re-entry of an earth satellite, the field strength may be substantially reduced to the order of 10,000 gauss. With magnetic field strengths of this order of magnitude, a 75% reduction in heat transfer to the surface of a flight vehicle may be expected.

An arrangement in accordance with the invention utilizing the reaction forces upon a magnetic field source in a magnetohydrodynamic system is illustrated in FIGS. 4 and 5. Referring to FIG. 4, a flight vehicle 30, having a center of gravity 31, includes a casing in the form of a nose cone 32 at the forward end of the vehicle. A magnetic field source may be enclosed within the nose cone 32 which produces a magnetic field in a direction indicated by the arrow 33. Where the flight vehicle 30 is propelled through the atmosphere at velocities sufficiently large to create an electrically conductive plasma in the region of the magnetic field indicated by the arrow 33, electrical currents will be induced within the plasma and a reaction force will occur upon the magnetic field source in the direction indicated by the arrow 34. As labeled in FIG. 4, such forces are sometimes referred to as "ponderomotive" forces.

FIG. 5 illustrates diagramatically the manner in which a magnetic field source in the form of a disc solenoid 35 may be mounted within the nose cone 32 for generating a magnetic field as illustrated in FIG. 4. The disc solenoid 35 may be connected to the current source 36 via a switch 37 so that when the switch 37 is closed, current is passed through the coil 35 to create a magnetic field which in turn produces the ponderomotive forces which act upon the coil 35 to turn the flight vehicle about the center of gravity 31. Accordingly, when the flight vehicle is in free flight, a change in the attitude of the vehicle may be produced by means of a magnetohydrodynamic system in accordance with the invention. Although only a single magnetic field source is illustrated in FIG. 5, by including a number of separate magnetic field sources of different orientation within the nose cone 32, the attitude of a flight vehicle in its path through the atmosphere may be readily altered in any direction.

Accordingly, the magnetohydrodynamic system in accordance with the invention not only functions as illustrated in FIGS. 1-3 as an exemplary mechanism for reducing the heat transfer to the surface of a flight vehicle, but also is adaptable to function as a steering mechanism as illustrated in FIGS. 4 and 5 when desired, by utilizing the reaction forces upon the magnetic field source.

In view of the fact that the ionized air between the nose of the vehicle and the shock wave plays such an important role in the consideration of the present invention and in view of the further fact that the ionization of the air was spoken of in only general terms, it would be worthwhile at this point to present specific data as to such ionization or electrical conductivity of air at reentry conditions. Thus, the electrical conductivity of a gas $\sigma$ is expressed by $$\sigma = \frac{n_e e^2}{m_e \overline{C}_e \sum_j n_j \overline{Q}_j}$$

where $n_e$ is the number density of free electrons, $e$ the electronic charge, $m_e$ the electronic mass, $n_j$ the number density of the species $j$, $\overline{Q}_j$ its Maxwell-averaged total electron collision cross section, and where $$\overline{C}_e = \left(\frac{8kT}{\pi m_e}\right)^{1/2}$$

($k$=Boltzmann's constant, T—temperature) is the mean speed of the electrons, Thermodynamic equilibrium with an electron temperature equal to the gas temperature is assumed.

The summation in Eq. 1 is extended over those species, neutrals as well as ions, which contribute appreciably to the total cross section. An inspection of the equilibrium composition of air in the range from 6000° K. to 24,000° K. and a density ratio $\rho/\rho_0$ ($\rho_0$=standard density) varying from $10^{-3}$ to 10 indicates that the neutrals of major importance are $N_2$, N and O. The cross sections for these species above an electron temperature of 6000° K. are rather similar, and nearly independent of the energy in the range considered. On this point see, for example, Lamb, L. and Lin, S., Electrical Conductivity of Thermally Ionized Air Produced in a Shock Tube, Journal of Applied Physics, vol. 28, No. 7, 1957. At much higher temperatures, the effect of the neutrals becomes negligible. The computations are based htereofore on a common cross section of the neutrals, $\overline{Q}_n$, which was taken as $0.8 \times 10^{-15}$ cm.$^2$.

The sum over all cross sections in Eq. 1 can therefore be expressed as $$\sum_j n_j \overline{Q}_j = n_n \overline{Q}_n + n_i \overline{Q}_i =$$

$$n_{A,o} \frac{\rho}{\rho_0}\left[(N_2+N+O)\overline{Q}_n + e^- \overline{Q}_i\right] \quad (2)$$

where $n_n$ and $n_i$ are the number densities of neutrals and ions, respectively. $n_{A,o}$ is the number of density equivalent "air atoms" at standard condition. $N_2$, N, O and $e^-$ are the number of N-molecules, N-atoms, O-atoms, and free electrons, respectively, per "air atom."

Spitzer and Härms's results (Transport Phenomena in a Completely Ionized Gas, Physical Review, vol. 89, No. 5, 1953) for the conductivity of a fully ionized gas, if written in terms of an equivalent cross section $\overline{Q}_i$ for the positive ions, give $$\overline{Q}_i = \left(\frac{\pi e^2}{4kT}\right)^2 \frac{\ln(aC_e^2)}{\gamma E} \quad (3)$$

for singly ionized ions, where $$q = \frac{m_e}{2e^3}\left[\frac{kT}{2\pi n_e}\right]^{1/2}$$

($n_e$=number density of the electrons, $n_e=n_i$) and $\gamma_E=0.582$. $C_e$ is the R.M.S. electron velocity $$C_e = \left(\frac{3kT}{m_e}\right)^{1/2}$$

The results of a computation of $\sigma$, based on Eqs. 1 and 3 are given in FIGURE 6.

Based upon the temperature and density behind a normal shock, the conductivity was calculated for different velocities U and altitudes H above sea level and is plotted in FIGURE 7. For comparison, the velocity of a satellite in the circular orbit of $7 \times 10^6$ m radius, and the escape velocity, have also been indicated.

It is also deemed worthwhile at this time to present an analysis and results for the weight optimization of a magnetic field producing assembly of the type that may be considered herein. A disc solenoid is used in all cases in the presentation.

The magnet, that is, the disc solenoid, must be cooled or it will melt due to the joule heating by the high current in the windings. Also, a power supply must be provided to energize it, as shown in FIG. 2 of the drawings. The total weight of the magnet equipment, $W_e$, is equal to the sum of the weights of the magnet coil, $W_M$, the liquid coolant, $W_L$, and the power supply, $W_p$.

$$W_e = W_M + W_L + W_p \quad (1)$$

This equation becomes $$W_e = \rho_M V_M + \frac{1}{h_L} R \int_{t_1}^{t_2} I^2(t)\,dt + sR \int_{t_1}^{t_2} I^2(t)\,dt \quad (2)$$

Here $V_M$ is the volume of the magnet coil, R the total electrical resistance of the coil, $\rho_M$ the density of the coil material, $h_L$ the heat of vaporization of the coolant, $s$ the weight-energy ratio of the power supply, I the magnet current, $t_1$ the magnet cut-on time, and $t_2$ the magnet cut-off time. In this formulation it has been assumed that all the liquid carried can be evaporated to cool the magnet. Weight for extra liquid, for structures, and for equipment to store and pump the coolant are included by increasing by 25 percent the value of $W_e$ obtained from optimizing Eq. 2.

From the Biot-Savart Law and from the geometry of the magnet, one obtains a relationship between I and $B_0$ of the following form $$I^2(t) = f[\delta, r_b, B_0^2(t)] \quad (3)$$

When this equation is substituted into Eq. 2 together with the proper expressions for the volume and resistance of the magnet coil, there results an equation of the form $$W_e = f\left[\delta, r_b, \int_{t_1}^{t_2} B_0^2(t)\,dt, \rho_M, \sigma_M h_L, s\right] \quad (4)$$

Since only constant current magnets are considered. Eq. 4 can be simplified to $$W_e = f[\delta, r_b, B_0, \Delta t, \rho_M, \sigma_M, h_L, s] \quad (5)$$

In this expression $\delta$ is the variable to be optimized; $r_b$ is the radius of the hemispherical nose of the vehicle; $B_0$ and $\Delta t$ are determined by the trajectory and by the desired value of the heat transfer ratio, S; $\rho_M$ and $\sigma_M$ are properties of the magnet material; $h_L$ is a property of the coolant, and $s$ is the performance parameter for the power supply.

Eq. 5 is optimized with respect to $\delta$ by solving the equation $dW_e/d\delta=0$ for the optimum $\delta$ and substituting this value back into Eq. 5 to obtain the minimum $W_e$.

As discussed previously various combinations of $B_0$, $t_1$, and $t_2$ that produce the desired value of S must be tried until the combination is found that yields the minimum $W_e$. Also the best magnet material and coolant must be chosen so that the simultaneous values of the parameters $\rho_M$, $\sigma_M$, and $h_L$ are such as to minimize $W_e$. The choice of magnet material and coolant is complicated by the fact that $\sigma_M$ and $h_L$ are interrelated, since the conductivity of the metal depends strongly upon the boiling point temperature of the coolant.

Four coolants have been considered: liquid $H_2O$, liquid $N_2$, liquid Ne, and liquid $H_2$. In all cases $H_2$ gives the minimum $W_e$. Roughly speaking, for the cases that have been investigated, magnet assembly weights with $H_2O$ are ten times those with $H_2$, with $N_2$ are six times those with $H_2$, and with Ne are two times those with $H_2$. It is apparent that to minimize weight both a high $h_L$ and a high $\sigma_M$ are desired. The reason $H_2$ is so superior is that the electrical conductivity of most materials increases extremely rapidly as the temperature falls. For example, the conductivity of copper, compared to that at the boiling point of $H_2O$ (373° K.), is roughly ten times greater at the liquid $N_2$ temperature (77° K.), 150 times greater at the liquid Ne temperature (27° K.), and 200 times greater at the liquid $H_2$ temperature (20° K.). In addition, the heat of vaporization of $H_2$ is several times greater than that for either $N_2$ or Ne. The one disadvantage with $H_2$ is its low density, which necessitates a relatively large storage container; however, in the present study, the required coolant storage volumes even for $H_2$ are not excessive. The results of weight optimizations are reported for the two best coolants, $H_2$ and Ne. As has been previously pointed out, the application of these cryogenic coolants will entail some additional developmental work, which should be carried out in the future if magnetoaerodynamic heat shielding is to be reduced to practice. However, cryogenic problems are considered to be beyond the scope of the present study.

Virtually all substances for which conductivity data are available have been considered in selecting the magnet material. To a first approximation the best magnet material is the one with the minimum value of the ratio $\rho_M \sigma_M$ at the coolant temperature. In all of the cases that have been computed, it has been found that the best magnet material is one or the other of the two elements, copper and lithium. Copper has a very high conductivity, whereas lithium has a very low density. The results of the weight optimizations are given for both these magnet materials. A lithium magnet may require a thin protective shell of an inert material to prevent any chemical reactions with the coolant, etc.

Optimized weights are tabulated for the ICBM missile trajectory, the recoverable earth satellite trajectory, and the recoverable moon satellite trajectory. For the ICBM trajectory, both a hemispherical blunt nose and a spiked nose are considered.

Values of the parameters that have been employed in this study are:

|  | ICBM, Blunt Nose | ICBM, Spiked Nose | Earth Satellite | Moon Satellite |
|---|---|---|---|---|
| Radius, ft | 0 | 0.1 | 3 | 3 |
| S | 0.5 | 0.5 | 0.5 | 0.5, 0.75 |
| | $H_2$ | | Ne | |
| $h_L$, joules/kg | 4.7×10⁵ | | 1.1×10⁵ | |
| | Cu, $H_2$ | Cu, Ne | Li, $H_2$ | |
| $\sigma_M$, mhos/m | 9.1×10⁹ | 6.4×10⁹ | 1.6×10⁹ | |

S—15 lb./kw.-hr.—1.9×10⁻⁶ kg./joule.

The following table compares Li and Cu magnets for various applications. $H_1$ and $H_2$ are the altitudes at which the magnet is cut-on and cut-off respectively. $V_L$ is the volume of the liquid coolant. P is the ohmic power consumption of the magnet. Values of $W_e$ include the 25 percent allowance for structure and other miscellaneous weights.

*Blunt Nose, $H_2$ Coolant*

| Material Magnet | $B_0$, gauss | $H_1$, 1,000 ft. | $H_2$, 1,000 ft. | $\Delta t$, sec. | $V_L$, ft.³ | P, kw. | $W_M$, lb. | $W_L$, lb. | $W_P$, lb. | $W_e$, lb. |
|---|---|---|---|---|---|---|---|---|---|---|
| ICBM, S=0.5 |||||||||||
| Cu | 80,000 | 250 | 45 | 24.5 | 10.8 | 412 | 69 | 47 | 42 | 197 |
| Li | 80,000 | 250 | 45 | 24.5 | 23.4 | 905 | 22 | 103 | 92 | 271 |
| EARTH SATELLITE, S=0.5 |||||||||||
| Cu | 10,000 | 300 | 187 | 93 | 19.1 | 188 | 150 | 83 | 73 | 382 |
| Li | 10,000 | 300 | 187 | 93 | 13.3 | 134 | 85 | 58 | 52 | 244 |
| MOON SATELLITE, S=0.5 |||||||||||
| Cu | 3,750 | 300 | 192 | 70 | 6.2 | 86 | 47 | 27 | 25 | 124 |
| Li | 3,750 | 300 | 192 | 70 | 3.7 | 48 | 29 | 16 | 14 | 74 |
| MOON SATELLITE, S=0.25 |||||||||||
| Cu | 10,000 | 300 | 175 | 110 | 20.2 | 172 | 165 | 88 | 79 | 415 |
| Li | 10,000 | 300 | 175 | 110 | 14.0 | 117 | 97 | 61 | 54 | 268 |

It is seen that Cu is better for the ICBM and Li is better for the satellites. The following table gives a comparison of a magnet assembly for a blunt nose missile versus a spiked nose missile. In the case of the spike, the value of S=0.5 applies to the spike itself.

*ICBM, S=0.5, Cu Magnet, $H_2$ Coolant*

| Nose Shape | $B_0$, gauss | $H_1$, 1,000 ft. | $H_2$, 1,000 ft. | t, sec. | $V_L$, ft.³ | P, kw. | $W_M$, lb. | $W_L$, lb. | $W_P$, lb. | $W_e$, lb. |
|---|---|---|---|---|---|---|---|---|---|---|
| Blunt | 80,000 | 250 | 45 | 24.5 | 10.8 | 412 | 69 | 47 | 42 | 197 |
| Spiked | 252,000 | 250 | 45 | 24.5 | 4.6 | 167 | 1/2 | 20 | 17 | 47 |

Lower values of S cannot be used for the spike because $B_0$ exceeds limitations imposed by the strengths of the magnet materials.

The next table presents comparative results for $H_2$ and Ne to perform the same mission.

*Blunt Nose, ICBM, S=0.5, Cu Magnet*

| Coolant | $B_0$, gauss | $H_1$, 1,000 ft. | $H_2$, 1,000 ft. | t, sec. | $V_L$, ft.$^3$ | P, kw. | $W_M$, lb. | $W_L$, lb. | $W_P$, lb. | $W_e$, lb. |
|---|---|---|---|---|---|---|---|---|---|---|
| $H_2$ | 80,000 | 250 | 45 | 24.5 | 10.8 | 412 | 69 | 47 | 42 | 197 |
| Ne | 80,000 | 250 | 45 | 24.5 | 1.9 | 412 | 142 | 187 | 42 | 464 |

The results show that the assembly with Ne weighs more than twice that with $H_2$. The only advantage of Ne is that the volume of the coolant is less. The final table gives the best results for each mission.

| Mission | S | $W_J$ (lb.) |
|---|---|---|
| ICBM | 0.5 | 197 |
| Earth Satellite | 0.5 | 244 |
| Moon Satellite | 0.5 | 74 |
| Do | 0.25 | 268 |

To achieve these marked reductions in heat transfer large forces must be produced in the fluid. Thus the above results clearly demonstrate that with magnetic equipment of reasonable weight, large and significant forces can be exerted on the fluid flowing about a missile.

Although a number of particular arrangements of the invention have been illustrated above by way of example, it is not intended that the invention be limited thereto. Accordingly, the invention should be considered to include any and all modifications, alternations or equivalent arrangements falling within the scope of the annexed claims.

What is claimed is:

1. In a system for controlling relative movement between an electrically conductive fluid and a flight vehicle, the combination of a flight vehicle casing capable of being propelled through an electrically conductive medium, and means enclosed within the flight vehicle casing for inducing electrical currents in the electrically conductive medium to produce forces acting between the flight vehicle casing and the electrically conductive fluid which control relative movement between the electrically conductive medium and the flight vehicle.

2. In a system for controlling the relative movement between an electrically conductive fluid medium and a flight vehicle, the combination of a flight vehicle casing capable of being propelled through the electrically conductive fluid medium, a magnetic field source supported by the flight vehicle casing and oriented in a direction to establish a magnetic field in a predetermined direction with respect to the direction of movement of the flight vehicle casing, and means selectively actuating the magnetic field source to establish magnetic fields within the electrically conductive medium surrounding the flight vehicle casing for inducing electrical currents within the electrically conductive medium which interact with the magnetic field source to control the relative movement between the flight vehicle and the electrically conductive medium.

3. In a flight vehicle adapted to be propelled at velocities at which a shock wave is produced which functions to establish an electrically conductive plasma in the region of the flight vehicle, the combination of a flight vehicle casing, and magnetic field source means contained within the flight vehicle casing for inducing currents within the electrically conductive plasma surrounding the flight vehicle casing which interact with the magnetic field source to control the attitude of the flight vehicle casing.

4. In a flight vehicle adapted to be propelled through the atmosphere at velocities producing a shock wave behind which in the region of the flight vehicle an electrically conductive plasma is present, the combination of a flight vehicle casing forming a part of the flight vehicle in a position in which the flight vehicle casing leads the flight vehicle in its direction of movement, and a magnetic field source associated with the flight vehicle casing adapted to establish an axial magnetic field in the direction of movement of the flight vehicle for inducing electrical currents within the region between the shock wave and the flight vehicle casing which increase the separation between the shock wave and the flight vehicle casing.

5. In a flight vehicle adapted to be propelled through the atmosphere at velocities at which a shock wave is produced adjacent the leading portion of the flight vehicle, means for reducing the transfer of heat between the atmosphere and the flight vehicle including the combination of a flight vehicle casing positioned at the forward end of the flight vehicle, and magnetohydrodynamic means enclosed within the flight vehicle casing for inducing currents in the atmosphere between the shock wave and the flight vehicle casing which function to increase the spacing between the shock wave and the flight vehicle casing whereby the transfer of heat between the atmosphere and the flight vehicle casing is reduced.

6. Apparatus in accordance with claim 5 in which said magnetohydrodynamic means comprises an electrical conductor in the form of a coil supported within the flight vehicle casing in a position in which the axis of the coil is aligned with the axis of the flight vehicle casing.

7. Apparatus in accordance with claim 6 including temperature sensitive actuating means for energizing said coil to produce a magnetic field in response to a predetermined temperature condition.

8. A steering system for a flight vehicle including the combination of a flight vehicle casing which is adapted to be propelled through the atmosphere at velocities at which an electrically conductive plasma is formed behind a shock wave in the region of the flight vehicle casing, and at least one magnetic field source associated with the flight vehicle casing which may be selectively energized to induce electrical currents within the electrically conductive plasma in a manner in which reaction forces are applied to the flight vehicle casing to control its flight path through the atmosphere.

9. In a flight vehicle which is adapted to pass through the atmosphere at velocities at which excessive heat transfer may take place between the atmosphere and the flight vehicle, the combination of a casing oriented to lead the flight vehicle in its direction of movement through the atmosphere, a magnetic field source contained within the casing adapted to generate a magnetic field within the atmosphere in a direction substantially aligned with the direction of movement of the flight vehicle, and means for selectively energizing the magnetic field source to induce currents within the atmosphere surrounding the casing which function to reduce the transfer of heat between the atmosphere and the casing.

10. Apparatus in accordance with claim 9 including temperature sensitive actuating means connected to the selective energizing means for establishing magnetic fields in the region of the flight vehicle casing in response to a predetermined temperature condition.

References Cited in the file of this patent

UNITED STATES PATENTS 2,714,309 Redemske _____ Aug. 2, 1955

FOREIGN PATENTS 931,295 France _____ Feb. 18, 1948

OTHER REFERENCES

Kantrowitz: "Introducing Magnetohydrodynamics," Astronautics, V. 3, N. 10, October 1958, pp. 18–20, 74–7.

McIlroy: "Magnetohydrodynamics," SAE Journal, V. 66, N. 4, April 1958, pp. 90–93.

Resler et al.: "The Prospects for Magneto-Aerodynamics," Journal of the Aero Space Sciences, V. 25, N. 4, April 1958, pp. 235–45 and 258.

N.A.C.A. Tech. Note 3971, May 1957.